Nov. 10, 1925.
E. J. RICHARDSON
FOOT CONTROL DEVICE FOR TRACTOR CLUTCHES
Filed Aug. 14, 1925
1,560,857
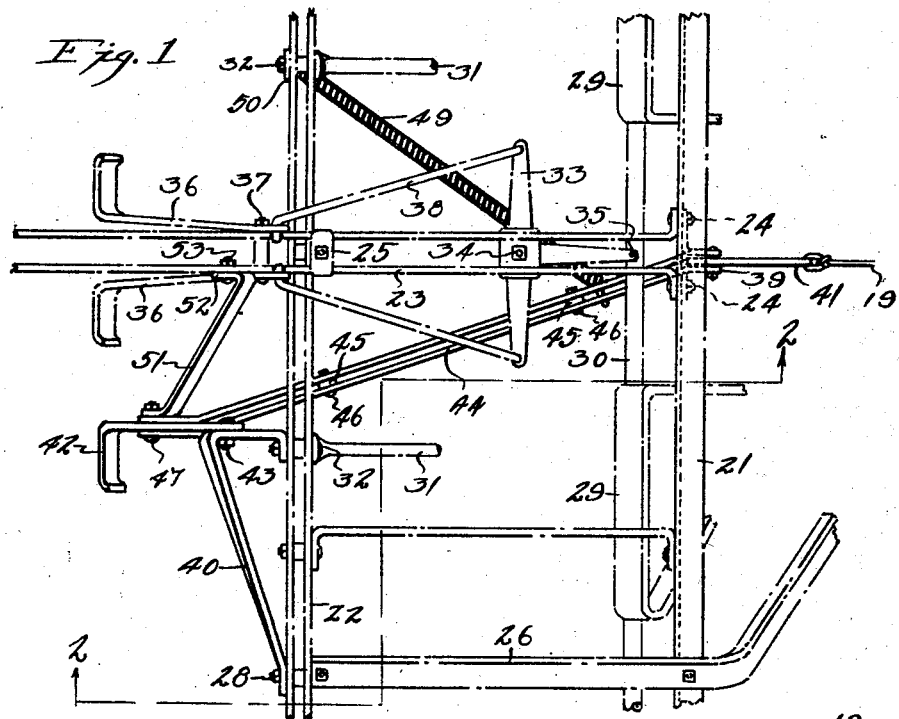
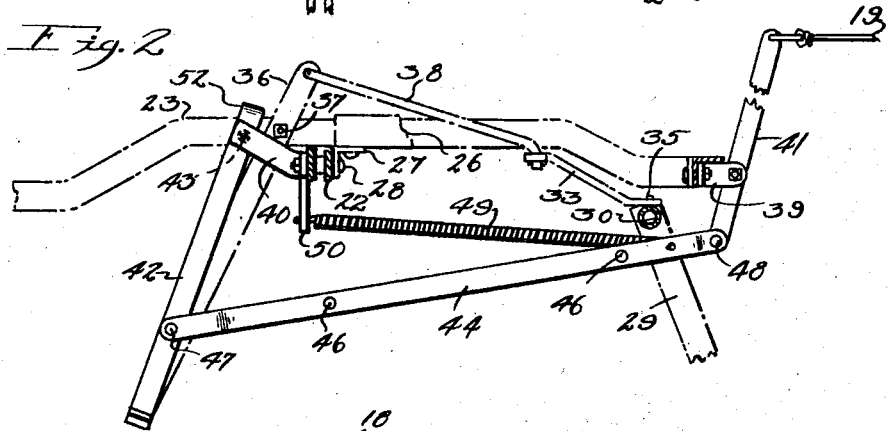
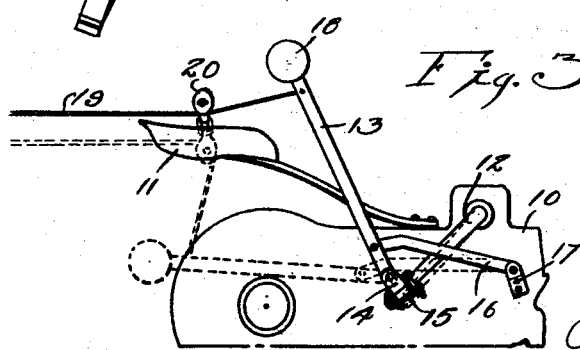
Inventor
Edmund J. Richardson Patented Nov. 10, 1925.

1,560,857

UNITED STATES PATENT OFFICE.

EDMUND J. RICHARDSON, OF MOVILLE, IOWA.

FOOT CONTROL DEVICE FOR TRACTOR CLUTCHES.

Application filed August 14, 1925. Serial No. 50,193.

*To all whom it may concern:*

Be it known that I, EDMUND J. RICHARDSON, a citizen of the United States, and a resident of Moville, in the county of Woodbury and State of Iowa, have invented certain new and useful Improvements in a Foot Control Device for Tractor Clutches, of which the following is a specification.

My invention relates to control mechanism for operating a tractor from a cultivator or other farm implement hitched to the tractor, and has for its object to provide a foot actuated control device to be attached to the implement for pulling a cable adapted to actuate the clutch lever of the tractor.

My invention aims to provide a simple and effective means for exerting a pull upon the clutch-actuating cable without necessitating the use of the hands of the operator, which are thereby left free to control the steering of the tractor.

My invention further resides in the application of the foot-actuated control device to an implement having certain features whereby the device may be attached without alteration of the implement.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a plan view of a portion of the implement, shown in broken lines, with my foot control device shown in full lines attached thereto.

Fig. 2 is a transverse sectional view taken on the line 2—2 of Fig. 1.

Fig. 3 is a side elevation of a portion of a tractor illustrating the particular clutch control mechanism which my foot-actuated device is intended to control.

Before proceeding to the description of my invention, which is adapted to use with a particular type of tractor clutch control now on the market, I will describe that clutch control device in order that the invention may be more fully understood.

In Fig. 3 I have shown the body or housing, 10, of a common make of tractor, which has the seat, 11, and the clutch lever, 12. The clutch control device, which does not form a part of my invention, comprises a lever, 13, pivoted to a yoke, 14, which is secured by a clip, 15, to the end of the clutch lever, 12, and which is linked by means of a bar, 16, to a bracket, 17, secured to the side of the housing, 10. The parts are so arranged that when the lever, 13, is in the upstanding position shown, the clutch lever, 12, will be in position to allow engagement of the clutch, whereas when the parts are in the dotted line position the clutch lever, 12, will be in position to disengage the clutch.

The lever, 13, is provided at its end with a weight, 18, and is actuated by means of a cable, 19, secured near the end of the lever and traveling through a pulley, 20, linked to the seat, 11.

The parts are so arranged that when the lever is in the dotted line position it will be locked beyond center so as to resist the spring-urged upward pull of the lever, 12, and as a result the lever may be swung to either of its positions by a sharp pull upon the cable, 19, the weight, 18, serving by its momentum to swing the lever to either extreme position.

In order to exert this sharp pull it has been previously necessary for the operator to grasp the end of the cable, 19, which is conveniently hitched to the implement upon which he is riding, and give it a sharp tug. My invention provides a means by which this may be accomplished by the foot of the operator.

In Fig. 1 is shown in broken lines an ordinary cultivator, having the forward transverse frame bar, 21, the rear transverse frame member, 22, the central longitudinal frame bar, 23, which comprises two ribs secured to the forward bar, 21, by means of bolts, 24, and to the rear bar, 22, by means of a clip, 25.

One of the side longitudinal frame bars, 26, is shown which is connected by means of an angle bracket, 27, bolted at 28 to the transverse bar member, 22.

The gangs of the cultivator are supported on hangers, 29, pivoted on a transverse shaft, 30, suitably journaled in the frame. Gang brace bars, 31, are bolted by means of bolts, 32, to the rear frame, 22, and extend downwardly and forwardly to the gangs, which are not shown.

In order to slide the shaft, 30, from side to side, a bell-crank lever, 33, pivoted at 34, in the frame is linked at 35 to the shaft, 30.

Foot levers, 36, are fulcrumed at 37 on either side of the central frame bar, 23, and from their upper ends engaging links, 38, extend to the arms of the bell-crank lever, 33.

Openings in the bar, 23, are provided rearwardly of the position shown for the bolt, 37, and one of these openings is used, as will hereinafter be described, to connect one of the parts of my invention to the bar, 23.

The foot-actuated control device comprises a first bracket, 39, secured by means of bolts, 24, to the forward transverse frame bar, 21, and a second bracket, 40, secured by means of the bolts, 32 and 28, on one side of the frame to the rear transverse frame member, 22.

The bracket, 40, is in the shape of a reversed figure seven in plan and is bent upwardly as shown so that its outer extremity is approximately on a level with the frame bar, 23, and aligned laterally with the additional opening for the bolt, 37, hereinbefore mentioned.

A forward lever 41 is fulcrumed intermediate of its ends in the bracket, 39, by means of a bolt, 41ª, and a foot lever, 42, is fulcrumed at its upper end against the longitudinal portion of the bracket, 40, at its outer end. A bolt, 43, is used for this purpose. A connecting link, 44 joins the levers, 41 and 42, being connected to the lever, 41, at its lower end, and to the lever, 42, intermediate of its ends, and is preferably formed of a pair of parallel bars spaced by washers, 45, and connected by bolts, 46.

The bars are bent at their ends and receive between them the respective levers, 42 and 41, being connected thereto by the bolts, 47 and 48, respectively.

A spring, 49, is linked at one end to the link, 44, and at its other end to a depending bracket, 50, secured by means of the bolt, 32, on the other side of the frame from the bracket, 40, to the frame member, 22. The spring, 49, is secured under tension so as to retain the parts in their retracted position when not in use. Thus, when the operator desires to throw out the clutch from the tractor, he need only push forwardly sharply with his foot against the foot lever, 42, and then quickly release the same, whereby the lever, 41, at its upper end will be jerked rearwardly and the cable, 19, which is connected to the upper end of the lever, 41, as shown, be given a sharp pull to throw the lever, 13, to the position shown in dotted lines. When it is desired to again throw in the clutch a second sharp push against the lever, 42, will cause the lever, 13, to be drawn from its dotted line to its full line position.

In order to brace the lever, 42, against side movement a swinging brace, 51, is provided, which is secured at its lower end to the bolt, 47, and at its upper end is arched upwardly and thence bent back upon itself, as at 52. The portion, 52, is pivoted by means of a bolt, 53, to the frame, 23, the bolt, 53, extending through the already existing bolt hole designed to receive the bolt, 37, in one of its alternative positions, as hereinbefore mentioned.

Thus it is unnecessary to drill any holes in the frame of the plow in order to attach my invention thereto.

The lever, 51, is arched at its upper end in order that it may not interfere with the rearward swinging of the right foot lever, 36, which would otherwise occur. The bolts, 43 and 53, being aligned horizontally and laterally, it will now be seen that the foot lever, 42, and the brace, 51, may swing in unison around this horizontal axis.

With the use of my invention the tractor control device, comprising a number of lines leading to the steering wheel and the clutch lever, respectively, may be much more readily handled since the steering of the tractor near the end of a row will occupy both hands of the operator, and it is highly desirable to control the clutch by the foot.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A foot actuated control device to be used in connection with an implement having longitudinal and spaced forward and rear transverse frame bars, comprising a bracket secured to the forward transverse bar, a forward vertically arranged lever fulcrumed on said bracket, a second bracket on the rear transverse bar, a depending foot lever swingingly fulcrumed on said second bracket, a link connecting the lower end of the forward lever and the foot lever, and a spring secured under tension between the lower end of the forward lever and the rear transverse frame.

2. A foot actuated control device to be used in connection with an implement having longitudinal and spaced forward and rear transverse frame bars, comprising a bracket secured to the forward transverse bar, a forward vertically arranged lever fulcrumed on said bracket, a second bracket on the rear transverse bar, a depending foot lever swingingly fulcrumed on said second bracket, a link connecting the lower end of the forward lever and the foot lever, a swinging brace secured to the foot lever near its lower end and extending upwardly and laterally to the longitudinal frame bar, said swinging brace being pivoted to said longitudinal frame bar at a point horizontally and laterally opposite from the fulcrum of the foot lever and a spring secured under tension between the lower end of the forward lever and the rear transverse frame.

3. A foot actuated control device to be used in connection with an implement having central and side longitudinal and spaced forward and rear transverse frame bars, and having laterally spaced, longitudinally positioned gang brace bars, secured to the rear transverse frame by means of gang brace bolts, comprising a bracket secured to the forward transverse bar, a forward vertically arranged lever fulcrumed on said bracket, a second bracket on the rear transverse bar, said bracket being secured to the bolt securing one of the side longitudinal bars to the rear transverse bar, and the gang brace bolt on the same side of the implement, a foot lever fulcrumed on said second bracket and depending therefrom, a link connecting the lower end of the forward lever and the foot lever, and a spring secured under tension between the lower end of the forward lever and the other gang brace bolt.

4. A foot actuated control device to be used in connection with an implement having a central longitudinal and spaced forward and rear transverse frame bars, comprising a forward lever fulcrumed intermediate its length on said forward transverse bar, a foot lever fulcrumed on the rear transverse bar and depending therefrom, a link connecting the lower end of the forward lever and the foot lever, and a spring secured under tension between the lower end of the forward lever and the rear transverse frame bar.

5. A foot actuated control device to be used in connection with an implement having a central longitudinal and spaced forward and rear transverse frame bars, comprising a forward lever fulcrumed intermediate its length on said forward transverse bar, a foot lever fulcrumed on the rear transverse bar and depending therefrom, a link connecting the lower end of the forward lever and the foot lever, a swinging brace secured to the foot lever near its lower end and extending upwardly and laterally to the longitudinal frame bar, said swinging brace being pivoted to said longitudinal frame bar at a point horizontally and laterally opposite from the fulcrum of the foot lever, and a spring secured under tension between the lower end of the forward lever and the rear transverse frame bar.

Signed at Moville, in the county of Woodbury and State of Iowa, this 8th day of August, 1925.

EDMUND J. RICHARDSON.